US008718799B2

United States Patent
McNab

(10) Patent No.: US 8,718,799 B2
(45) Date of Patent: May 6, 2014

(54) METHOD AND SYSTEM FOR PROCESS CONTROL CONFIGURATION CHANGES

(75) Inventor: Keith George McNab, Albany, NY (US)

(73) Assignee: GE Fanuc Intelligent Platforms, Inc., Charlottesville, VA (US)

(*) Notice: Subject to any disclaimer, the term of this patent is extended or adjusted under 35 U.S.C. 154(b) by 1226 days.

(21) Appl. No.: 12/119,053

(22) Filed: May 12, 2008

(65) Prior Publication Data

US 2009/0281639 A1    Nov. 12, 2009

(51) Int. Cl.
*G06F 19/00* (2011.01)

(52) U.S. Cl.
USPC ............... 700/40; 700/42; 318/564; 318/610

(58) Field of Classification Search
USPC ............... 700/40–43; 318/564, 160
See application file for complete search history.

(56) References Cited

U.S. PATENT DOCUMENTS

| | | | | |
|---|---|---|---|---|
| 4,587,470 A | * | 5/1986 | Yamawaki | 318/564 |
| 4,745,541 A | * | 5/1988 | Vaniglia et al. | 700/12 |
| 4,874,999 A | * | 10/1989 | Kuwabara et al. | 318/610 |
| 5,093,609 A | * | 3/1992 | Sakamoto et al. | 318/610 |
| 5,229,699 A | * | 7/1993 | Chu et al. | 318/610 |
| 5,875,109 A | * | 2/1999 | Federspiel | 700/40 |

FOREIGN PATENT DOCUMENTS

| | | |
|---|---|---|
| CN | 1993660 A | 7/2007 |
| EP | 0318006 A | 5/1989 |
| EP | 0424862 A | 5/1991 |

OTHER PUBLICATIONS

Vukie et al. "Lectures on PID Controllers", Apr. 2002, pp. 27-28.*
Cheng-Ching Yu, "Auto-tuning of PID Controller a Relay Feedback Approach", 2006.*
PCT Search Report issued in connection with corresponding PCT Application No. US09/39881 on Apr. 8, 2009.
The translation of Chinese Office Action issued in connection with corresponding CN Patent Application No. 200980117797.0 dated on Jul. 11, 2012.

* cited by examiner

*Primary Examiner* — Kavita Padmanabhan
*Assistant Examiner* — Douglas Lee
(74) *Attorney, Agent, or Firm* — Global Patent Operation; Mark A. Conklin

(57) ABSTRACT

A method and system for process control configuration changes are described. In one embodiment, a method for switching from a first control algorithm to a second control algorithm in a continuous process control system is described. The method, in the one embodiment, includes executing the first control algorithm, determining to switch from the first control algorithm to the second control algorithm, and executing the second control algorithm. For at least a first execution of the second control algorithm, at least one state variable used in the second control algorithm is adjusted.

2 Claims, 4 Drawing Sheets

METHOD AND SYSTEM FOR PROCESS CONTROL CONFIGURATION CHANGES

BACKGROUND OF THE INVENTION

The present invention relates generally to continuous process control (CPC) and, more particularly, to dynamically configuring a CPC algorithm.

A commonly used algorithm for continuous process control is known as a "PID" algorithm, where the term "PID" refers to proportional, integral, and derivative. In industrial control systems there are many different types of PID algorithms. The most common types of PID algorithms are either "non-interacting" or "interacting". With an interacting algorithm, the proportional, integral, and derivative terms are combined in a way in which the terms interact, e.g., the terms are determined in series. With a non-interacting algorithm, the proportional, integral and derivative terms are combined in a way in which the terms do not interact, e.g., the terms are determined in parallel.

Each algorithm type has benefits in different applications and in different control modes. In a control application it may be desirable to iteratively switch back and forth from one control algorithm type to the other control algorithm type in order to heuristically determine the best algorithm for the application. Also over the course of system operation, different control objectives and operating conditions may arise that would make it desirable to switch from one control algorithm type to the other control algorithm type. An example would be a split-range temperature control where the PID output is split into two ranges; one for heating and one for cooling. The desired algorithm type for the heating range may be different from the desired algorithm type for the cooling range. In a continuous process control (CPC) application, stopping the control system to change the control algorithm can cost an inordinate amount of time and money.

In an attempt to avoid such loss of time and money, some CPC algorithms provide for dynamic configuration, which means switching between PID algorithm types without requiring that the control system be stopped. With such dynamic configuration, there can be an abrupt change in the control system algorithm output. Such an abrupt change can cause the controlled process to become unstable, possibly resulting in an emergency shutdown and/or end product degradation.

BRIEF DESCRIPTION OF THE INVENTION

In one embodiment, a method for switching from a first control algorithm to a second control algorithm in a continuous process control system is described. The method, in one embodiment, includes executing the first control algorithm, determining to switch from the first control algorithm to the second control algorithm, and executing the second control algorithm. For at least a first execution of the second control algorithm, at least one state variable used in the second control algorithm is adjusted.

In another embodiment, a process control system for controlling a process is described. The system includes a plurality of sensors configured to detect parameters of the process to be controlled, a plurality of local controllers configured to adjust the parameters of the process, and at least one central controller coupled to the sensors and to the local controllers. The central controller is configured to execute continuous process control algorithms to determine adjustments to be made by the local controller based on data from the sensors. The central controller is further configured to switch from a first control algorithm to a second control algorithm and, for at least a first execution of the second control algorithm, adjusting at least one state variable used in the second control algorithm.

In yet another embodiment, a controller for a continuous process control system is described. The controller includes a processor coupled to a memory. The processor is programmed to execute continuous process control algorithms to generate a PID output. The controller is further programmed to switch from a first control algorithm to a second control algorithm and, for at least a first execution of the second control algorithm, adjust at least one state variable used in the second control algorithm.

DETAILED DESCRIPTION OF THE INVENTION

The following detailed description illustrates embodiments of the invention by way of example and not by way of limitation. It is contemplated that the invention has general application to continuous process control systems and is not limited to implementation in connection with any one particular such system.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The term processor, as used herein, refers to central processing units, microprocessors, microcontrollers, reduced instruction set circuits (RISC), application specific integrated circuits (ASIC), logic circuits, and any other circuit, processor, or controller capable of executing the functions described herein. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 1:
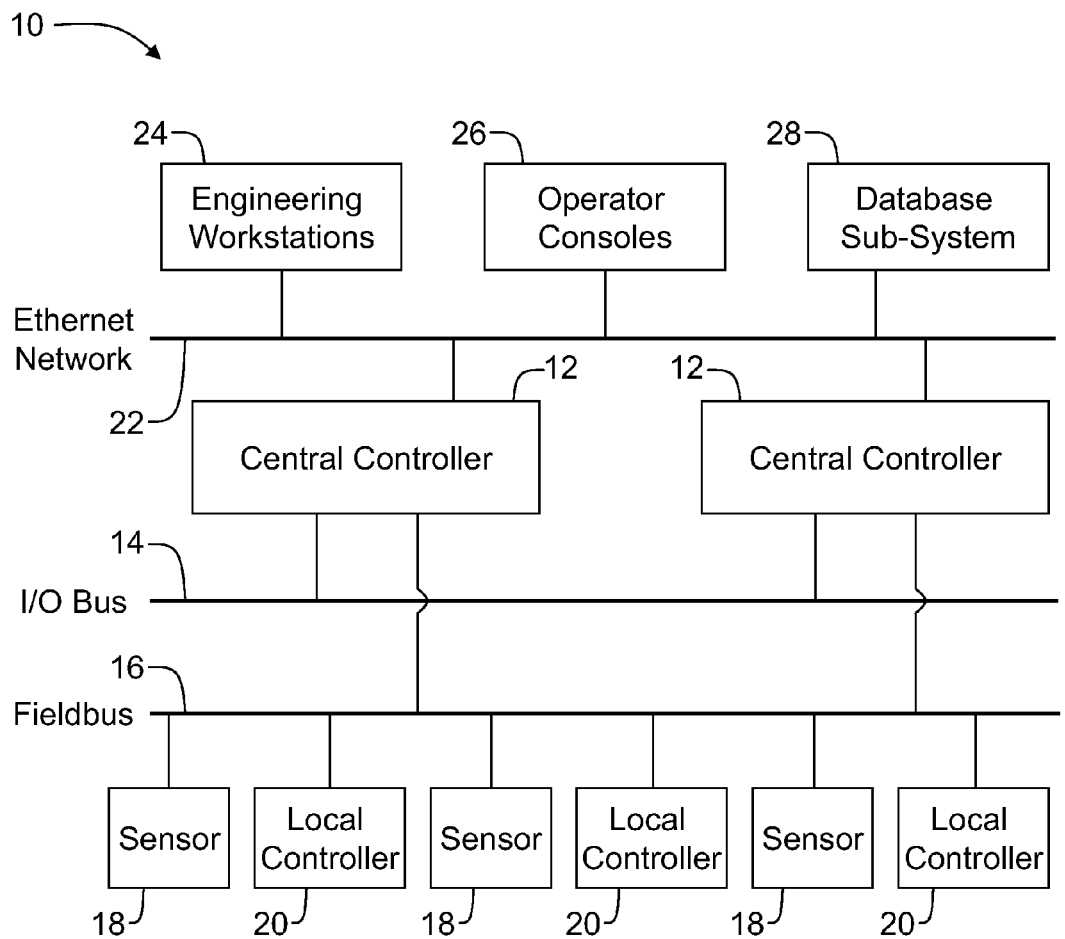
FIG. 1 is a schematic block diagram of a continuous process control system.

FIG. 1 is a schematic block diagram of a continuous process control system 10. System 10 includes central controllers 12, or processors, coupled to an input/output (I/O) bus 14 and a fieldbus 16. The type of input/output bus 14 and fieldbus 16 selected depends on the particular type of system being controlled, and any one of numerous known and commercially available input/output buses and fieldbuses can be used. Input/output bus 14 and fieldbus 16 are coupled to various sensors 18 and local controllers 20 coupled to the system 10 to be controlled (not shown). Again, the particular sensors 18 and local controllers 20 depends on the particular type of system being controlled, as is well known in the art.

Central controllers 12 also are coupled to an Ethernet based network 22. Engineering workstations 24 for use in connection with designing, creating, and maintaining system configuration are coupled to network 22. Operator consoles 26 for operators to monitor and control the process also are coupled to network 22. A database sub-system 28, sometimes referred to as a historian, coupled to network 22 handles storage and retrieval of process data. Database sub-system 28 also provides version control for process control strategies, including audit trail capabilities.

FIG. 1 illustrates one of numerous example architectures for a continuous process control system. The present PID algorithms are not limited to use in connection with any one particular control system. An example of a known and commercially available control system is the Proficy® Process System commercially available from General Electric Company, Fairfield, Conn.

In operation, central controllers 12 receive data from various sensors 18 located at selected data points of the system to be controlled. The received data is stored by database management sub-system 28. In addition, such received data can be used by central controllers 12 and local controllers 20 to make adjustments to components of the controlled system.

Figure 2:
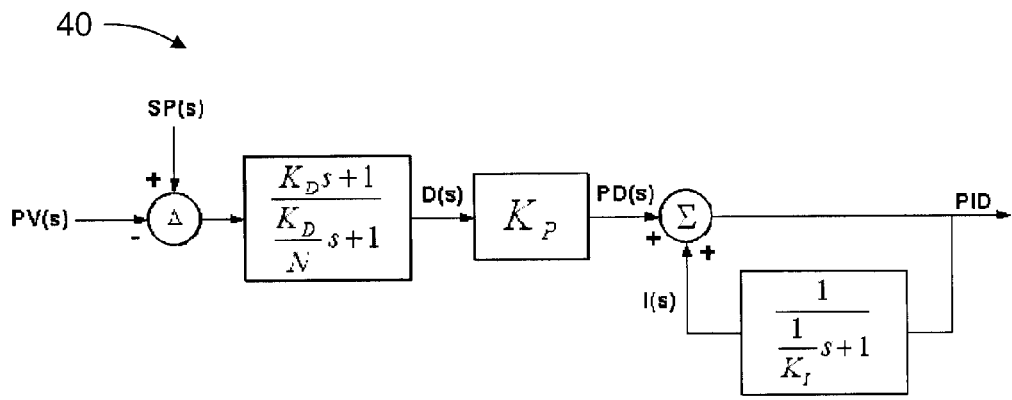
FIG. 2 is a block diagram of a series-type PID algorithm.
Figure 3:
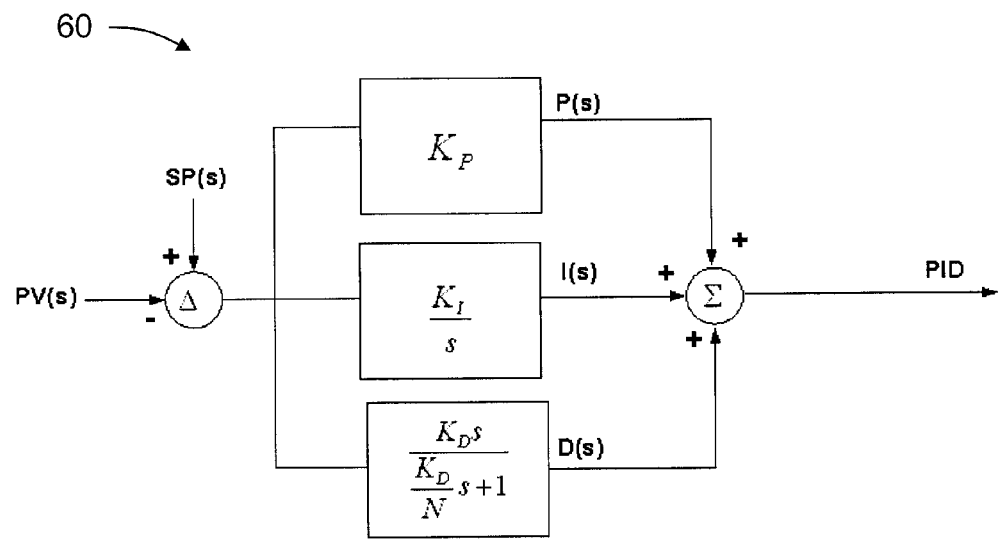
FIG. 3 is a block diagram of a parallel-type PID algorithm.

Various control algorithms are stored in and executed by central controllers 12. For example, continuous process control algorithms are stored in controllers and are executed by controllers in connection with providing continuous control of the system being controlled. An example of one such algorithm, a series PID algorithm 40, is illustrated in FIG. 2. Another example algorithm, a parallel PID algorithm 60, is illustrated in FIG. 3. The parameters referenced in the algorithms illustrated in FIGS. 2 and 3 are set forth below.

PV(s) is the process variable to be controlled
SP(s) is the setpoint, i.e., a desired value of the process variable
$K_D$ is the derivative time in minutes
N is the derivative filter parameter
P(s) is the proportional term
I(s) is the integral term
D(s) is the derivative term
$K_P$ is the proportional gain
PD(s) is the proportional and derivative term
$K_I$ is the integral reset in repeats per minute
PID(s) is the proportional and integral and derivative term As shown in FIG. 2, the process variable to be controlled PV(s) and the setpoint for that process variable SP(s) are summed to obtain the difference Δ between the value of the variable and the setpoint. The derivative term D(s) is then generated and the proportional and derivative term PD(s) is then generated. The proportional and derivative term PD(s) is then summed with the integral term I(s) to generate the proportional and integral and derivative term PID. As show in FIG. 2, the proportional, integral and derivative terms are generated in series and are not independent of each other, i.e., the terms interact.

FIG. 3 illustrates a parallel PID algorithm. As shown in FIG. 3, the process variable to be controlled PV(s) and the setpoint for that process variable SP(s) are summed to obtain the difference Δ between the value of the variable and the setpoint. The proportional term P(s), the integral term I(s), and the derivative term D(s) are then generated, independent of each other. The terms P(s), I(s), and D(s) are then summed to generate the proportional, integral and derivative (PID) term. As show in FIG. 3, the proportional, integral and derivative terms are generated in parallel and are independent of each other, i.e., the terms do not interact.

Figure 4:
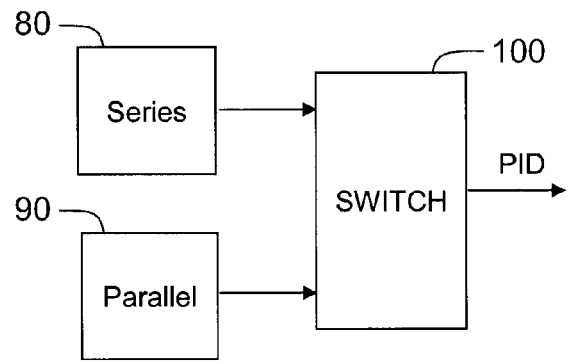
FIG. 4 is a block diagram of series and parallel types of PID algorithms and a dynamic "bumpless" switch.

FIG. 4 illustrates, in block diagram form, series 80 and parallel 90 types of PID algorithms and a dynamic "bumpless" switch 100. As used herein, "bumpless" means to facilitate the avoidance of abrupt changes to the control system outputs that cause the controlled process to become unstable or end product degradation. During operation, one of the PID algorithms is selected by controller for execution, and controller causes switch to select the output from such selected algorithm to generate output PID. Due to changing parameters, controller may determine to switch from the one PID algorithm to the other PID algorithm. Such determination can be made, for example, based on empirical data related to the process being controlled. When such determination is made, controller causes switch to select the output from the other algorithm to generate output PID.

The integral term, shown as I(s) in both FIGS. 2 and 3, is persisted between executions of the function block. If a switch between algorithms occurs, the integral term by its nature would not abruptly change. Therefore, only the proportional and derivative terms are compensated to ensure a "bumpless" switch 100.

In order to compensate the derivative term properly for a "bumpless" switch, the fact that the derivative can be configured to be based on the error or process variable must be considered. Stepwise changes in the setpoint could result in derivative kick which is undesirable and, hence, in some applications of PID control, it is desirable to only have the derivative based on the process variable. This fact adds to the complexity of determining the proper compensation required on the derivative term for a bumpless switch in the algorithms pictured in FIGS. 2 and 3. To minimize this complexity in FIG. 5, which illustrates a series PID algorithm 80, and in FIG. 6, which illustrates a parallel PID algorithm 90, the superposition principle is applied to have the derivative term be the sum of the individual responses of the inputs PV(s) and SP(s) to the respective derivative transfer function. This allows the algorithm to set the derivative transfer function for the input SP(s) to unity when the derivative is configured to be based only on the process variable.

Figure 5:
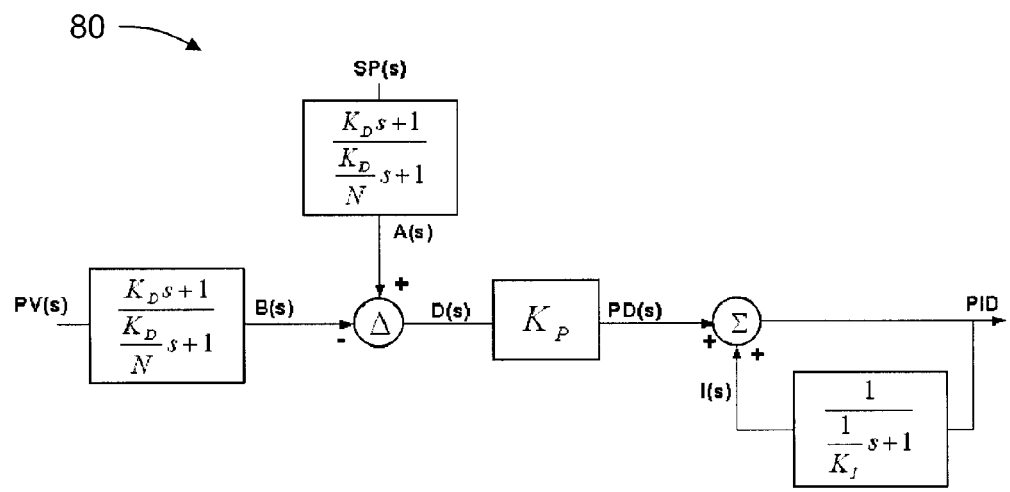
FIG. 5 is a block diagram of a series-type PID algorithm for use with the dynamic bumpless switch illustrated in FIG. 4.
Figure 6:
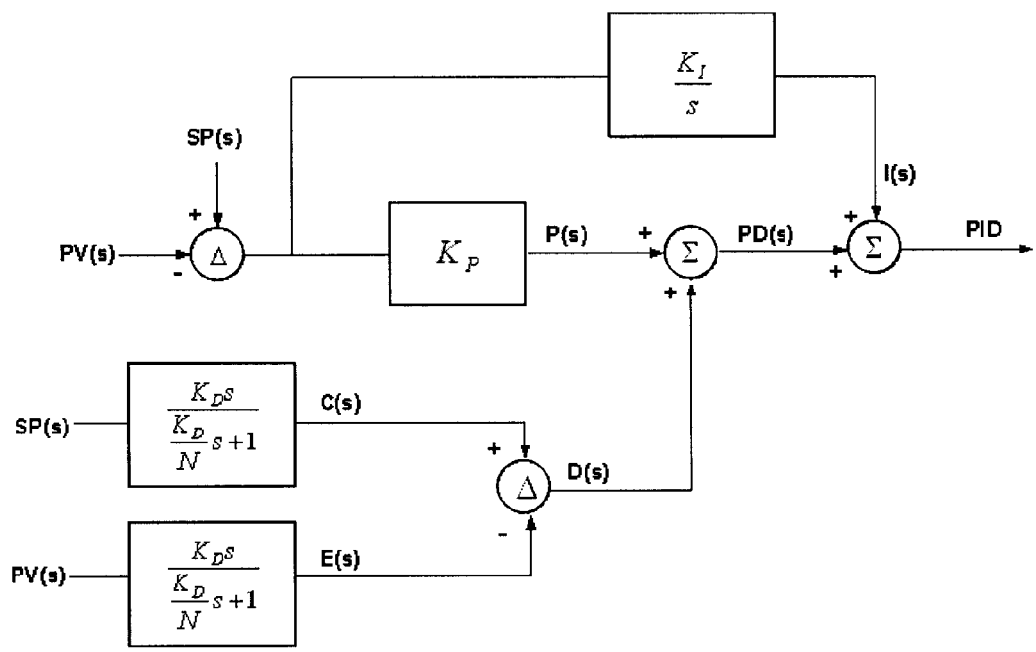
FIG. 6 is a block diagram of a parallel-type PID algorithm for use with the dynamic bumpless switch illustrated in FIG. 4.

Specifically, with respect to the series and parallel algorithms illustrated in FIGS. 5 and 6, and if derivative D(s) is based on the error then:

$$A(s) = SP(s) \cdot \frac{K_D s + 1}{\frac{K_D}{N} s + 1}$$

$$C(s) = SP(s) \cdot \frac{K_D s}{\frac{K_D}{N} s + 1}$$

Else, if the derivative term is based only on the process variable, then both A(s) and C(s) are equal to SP(s).

Furthermore, in FIGS. 5 and 6, it is illustrated that in order to achieve a "bumpless" transfer between algorithm types, PD(s) must be compensated so that the value of PID remains equal to its previous value before the switch.

Specifically, the PD term for the series algorithm is:

$$PD(s)_{SERIES} = [A(s) - B(s)] \cdot K_P \quad (1)$$

where $$A(s) = SP(s) \cdot \frac{K_D s + 1}{\frac{K_D}{N} s + 1}$$

if the derivative term is based on error, $$\text{else } A(s) = SP(s), \quad B(s) = PV(s) \cdot \frac{K_D s + 1}{\frac{K_D}{N} s + 1}$$

The PD term for the parallel algorithm is:

$$PD(s)_{PARALLEL} = [C(s) - E(s)] + [SP(s) - PV(s)] \cdot K_P \quad (2)$$

where $$C(s) = SP(s) \cdot \frac{K_D s}{\frac{K_D}{N} s + 1}$$

if the derivative term is based on error, else $C(s) = SP(s)$, $$E(s) = PV(s) \cdot \frac{K_D s}{\frac{K_D}{N} s + 1}$$

Distributing $K_P$ to the SP(s) and PV(s) terms in the above equations yield $$PD_{SERIES} = A(s) \cdot K_P - B(s) \cdot K_P \quad (3)$$

and:

$$PD_{PARALLEL} = C(s) - E(s) + SP(s) \cdot K_P - PV(s) \cdot K_P \quad (4)$$

Setting equations (3) and (4) equal to one another yields:

$$A(s) \cdot K_P - B(s) \cdot K_P = C(s) - E(s) + SP(s) \cdot K_P - PV(s) \cdot K_P \quad (5)$$

The equality defined in equation (5) is maintained to realize a bumpless switch 100, or transfer. Therefore, when switching from parallel 90 to series 80 algorithms, state variables A(s) and B(s) are re-calculated upon the first execution of the series algorithm 80 after the switch using:

$$A(s) = \frac{1}{K_P} C(s) + SP(s) \quad (6)$$

$$B(s) = \frac{1}{K_P} E(s) + PV(s) \quad (7)$$

Likewise from equation (5), when switching from series 80 to parallel 90 algorithms, state variables C(s) and E(s) are re-calculated upon the first execution of the parallel algorithm 90 after the switch using:

$$C(s) = K_P[A(s) - SP(s)] \quad (8)$$

$$E(s) = K_P[B(s) - PV(s)] \quad (9)$$

In a digital implementation of the advanced PID function block with dynamic algorithm switching, the state variables C(s) and A(s) are represented with the same variable H_SP(s), making equation (6):

$$H\_SP(s) = \frac{1}{K_P} H\_SP(s) + SP(s) \quad (10)$$

and equation (8):

$$H\_\_SP(s) = K_P[H\_\_SP(s) - SP(s)] \quad (11)$$

Such representation facilitates minimizing variables used in the algorithm and in equation (10), upon a detection of a switch from parallel 90 to series 80, H_SP(s) is the last C(s) calculated before the switch and in equation (11) H_SP(s) is the last A(s) calculated before the switch from series to parallel, hence equations (10) and (11) remain valid. If the derivative is based only on the process variable, then H_SP(s) is equal to the setpoint in both algorithm types and no adjustment is necessary.

Similarly, the state variables B(s) and E(s) are represented with the same variable H_PV(s) making equation (7):

$$H\_PV(s) = \frac{1}{K_P} H\_PV(s) + PV(s) \quad (12)$$

and equation (9):

$$H\_PV(s) = K_P[H\_PV(s) - PV(s)] \quad (13)$$

In equation (12), upon a detection of a switch from parallel 90 to series 80, H_PV(s) is the last E(s) calculated before the switch and in equation (13) H_PV(s) is the last B(s) calculated before the switch from series 80 to parallel 90, hence equation 12 and 13 remain valid.

As explained above, bumpless switching is achieved when switching from parallel 90 to series 80 by dynamically adjusting the state variables H_SP(s) and H_PV(s) using equations (10) and (12) respectively on the first execution of the series algorithm 80 after the switch. That is, for the first determination of the value PID using the series algorithm 80 subsequent to the switch, state variables H_SP(s) and H_PV(s) are adjusted using equations (10) and (12). Of course, after the bumpless switch, the state variables will immediately respond to changes in the process variable and setpoint as governed by the series algorithm.

Bumpless switching is achieved when switching from series 80 to parallel 90 by dynamically adjusting the state variables H_SP(s) and H_PV(s) using of equations (11) and (13) respectively on the first execution of the parallel algorithm 90 after the switch. That is, for the first determination of PID using the parallel algorithm 90 subsequent to the switch, state variables H_SP(s) and H_PV(s) are adjusted using equations (11) and (13). Again, after the bumpless switch, the state variables will immediately respond to changes in the process variable and setpoint as governed by the parallel algorithm.

Although specific equations are described above in connection with bumpless switching, it is contemplated that in alternative embodiments, other techniques can be used to avoid changes in the algorithm output that may result in system instability. For example, known smoothing and averaging algorithms can be utilized in connection with making such a switch, wherein over a predetermined period of time (e.g., 5-10 seconds), the values of the outputs generated with the currently selected algorithm is averaged with a set of previously generated and defined outputs, so that the transition from the output generated with the initial algorithm to the output generated with the current algorithm does not represent a step function change in the generated outputs. The drawback to this method is that the output's response to actual process disturbances may become sluggish during this transition time, whereas the equations presented in connection with the "bumpless" switch are applied only at the time the switch occurs.

In addition, implementing such control algorithms and switching in software or firmware, is believed to provide the added benefits of reduced complexity and reduced variable usage as compared to manual switching or analog switching.

As will be appreciated based on the foregoing description, the above-described embodiments may be implemented using computer programming and/or engineering techniques including computer software, firmware, hardware or any combination or subset thereof, wherein the technical effect is switching between different types (series and parallel) of control algorithms. Any such resulting program, having computer-readable code, may be embodied or provided within one or more computer-readable media, thereby making a computer program product, i.e., an article of manufacture, according to the above described embodiments. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A controller for a continuous process control system, said controller comprising a processor coupled to a memory, said processor programmed to execute continuous process control algorithms to generate a PID output, said controller further programmed to switch from a first control algorithm to a second control algorithm and, for at least a first execution of the second control algorithm, adjust at least one state variable used in said second control algorithm, wherein the at least one state variable comprises a process variable or a setpoint value of the process variable, wherein the first control algorithm is a parallel PID algorithm and the second control algorithm is a series PID algorithm and wherein state variables H_SP(s) and H_PV(s) are adjusted for at least a first execution of the series PID algorithm, where, $$H\_SP(s) = \frac{1}{K_P} H\_SP(s) + SP(s), \text{ and}$$

$$H\_PV(s) = \frac{1}{K_P} H\_PV(s) + PV(s),$$

where:
PV(s) is the process variable to be controlled,
SP(s) is the setpoint, and
$K_P$ is the proportional gain.

2. A controller for a continuous process control system, said controller comprising a processor coupled to a memory, said processor programmed to execute continuous process control algorithms to generate a PID output, said controller further programmed to switch from a first control algorithm to a second control algorithm and, for at least a first execution of the second control algorithm, adjust at least one state variable used in said second control algorithm, wherein the at least one state variable comprises a process variable or a setpoint value of the process variable, wherein, the first control algorithm is a series PID algorithm and the second control algorithm is a parallel PID algorithm and wherein, state variables H_SP(s) and H_PV(s) are adjusted for at least a first execution of the parallel PID algorithm, where:

$H\_SP(s) = K_P[H\_SP(s) - SP(s)]$, and $H\_PV(s) = K_P[H\_PV(s) - PV(s)]$ where:
PV(s) is the process variable to be controlled,
SP(s) is the setpoint, and
$K_P$ is the proportional gain.

* * * * *